（12）United States Patent
Edelmann et al.

(10) Patent No.: US 10,443,656 B2
(45) Date of Patent: Oct. 15, 2019

(54) ROLLING-ELEMENT BEARING UNIT FOR WHEEL BEARING ASSEMBLY

(71) Applicant: Aktiebolaget SKF, Gothenburg (SE)

(72) Inventors: Ludwig Edelmann, Sulzthal (DE); Matthias Schuler, Stadtlauringen (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/634,341

(22) Filed: Jun. 27, 2017

(65) Prior Publication Data

US 2018/0003236 A1 Jan. 4, 2018

(30) Foreign Application Priority Data

Jun. 29, 2016 (DE) .................. 10 2016 211 781

(51) Int. Cl.
 *F16C 19/36* (2006.01)
 *F16C 19/38* (2006.01)
 (Continued)

(52) U.S. Cl.
 CPC .......... *F16C 33/805* (2013.01); *B60B 27/001* (2013.01); *B60B 27/0078* (2013.01);
 (Continued)

(58) Field of Classification Search
 CPC ............... F16C 33/7813; F16C 33/783; F16C 33/7856; F16C 33/7859; F16C 33/7866;
 (Continued)

(56) References Cited

U.S. PATENT DOCUMENTS 2,266,175 A * 12/1941 Delaval-Crow ...... F16C 19/185
 277/555
3,838,898 A * 10/1974 Bird .................... F16C 33/7873
 384/487
(Continued)

FOREIGN PATENT DOCUMENTS

EP 2004424 A1 12/2008
JP 2004-190736 * 7/2004
(Continued)

OTHER PUBLICATIONS

Translation of JP2004-190736 obtained Jan. 4, 2018.*

*Primary Examiner* — James Pilkington
(74) *Attorney, Agent, or Firm* — Bryan Peckjian; SKF USA Inc. Patent Dept.

(57) ABSTRACT

A rolling-element bearing unit for a wheel bearing assembly of a vehicle includes a rolling-element bearing with an outer ring, a an inner ring, a bearing interior between the outer ring and the inner ring and a plurality of rolling elements in the bearing interior. The inner ring has an inner ring surface facing the bearing interior and a first and a second axial end surface. A first seal assembly includes a retainer fixed on the bearing outer ring and a seal element configured to slidingly seal against the bearing inner ring surface or against a slip sleeve carried by the bearing inner ring. The retainer is an angle bracket having an axially extending annular leg and a radially inwardly extending annular flange, and radially inwardly extending flange projects radially inwardly beyond the bearing inner ring surface, for example, over a step in the first axial end surface.

9 Claims, 3 Drawing Sheets

(51) Int. Cl.
  *F16C 33/78*   (2006.01)
  *F16C 33/80*   (2006.01)
  *B60B 27/00*   (2006.01)
  *F16C 19/54*   (2006.01)

(52) U.S. Cl.
  CPC .......... *F16C 19/386* (2013.01); *F16C 19/543* (2013.01); *F16C 33/7813* (2013.01); *F16C 33/7823* (2013.01); *F16C 33/7856* (2013.01); *F16C 33/7879* (2013.01); *B60B 27/0073* (2013.01); *F16C 19/364* (2013.01); *F16C 2326/02* (2013.01)

(58) Field of Classification Search
  CPC .............. F16C 33/7873; F16C 33/7876; F16C 33/7879; F16C 33/805; F16C 2326/02
  See application file for complete search history.

(56) References Cited

U.S. PATENT DOCUMENTS

| | | | | |
|---|---|---|---|---|
| 4,336,971 A | * | 6/1982 | Reiter | B21B 31/07 |
| | | | | 384/484 |
| 4,428,630 A | * | 1/1984 | Folger | F16C 19/386 |
| | | | | 277/552 |
| 2012/0098205 A1 | * | 4/2012 | Fritz | F16C 33/782 |
| | | | | 277/411 |

FOREIGN PATENT DOCUMENTS

| | | | |
|---|---|---|---|
| JP | 2005-299753 | * | 10/2005 |
| WO | 2004099637 A1 | | 11/2004 |

* cited by examiner

# ROLLING-ELEMENT BEARING UNIT FOR WHEEL BEARING ASSEMBLY

CROSS-REFERENCE

This application claims priority to German patent application no. 10 2016 211 781.5 filed on Jun. 29, 2016, the contents of which are fully incorporated herein by reference.

TECHNOLOGICAL FIELD

The present disclosure relates to a rolling-element bearing unit, in particular for a wheel bearing assembly of a vehicle as well as a wheel bearing assembly including such a rolling-element bearing unit.

BACKGROUND

Wheel bearing assemblies, in particular for commercial vehicles, usually include two axially adjacent rolling-element bearings, each including a bearing outer ring and each including a bearing inner ring, between which rolling elements are disposed. During installation into the wheel bearing the bearing inner rings including the roller set and the bearing outer rings are separately assembled and lubricated. In order to provide a simplified installation with such a wheel bearing assembly it is also known to provide the rolling-element bearings as preassembled bearing units. However, it is problematic here that the bearing rings must be secured during transport in order to prevent the respective bearing ring from sipping out of the rolling-element bearing or generally to prevent the rolling-element bearing from falling apart.

It is known from the prior art, for example, to provide a retaining element that secures the bearing rings of the preassembled bearing unit during transport. However, it is disadvantageous here that prior to the installation of the rolling-element bearing unit into the wheel bearing the retaining element must be removed again, with the result that production times and manufacturing costs increase.

In addition, the retaining element cannot safeguard against a dirt ingress, with the result that dirt can enter into the rolling-element bearing during transport or installation. It is also problematic that even with such preassembled bearings a greasing of the bearing must occur during installation, since although the retaining elements hold the bearing rings in their predetermined positions, they do not ensure that lubricant remains in the bearing. It is thus possible for the bearing to be lubricated with an "incorrect" lubricant during installation, which reduces the service life of the bearing.

SUMMARY

It is therefore an aspect of the present disclosure to provide a rolling-element bearing unit for a wheel bearing wherein the bearing rings are secured during transport, they have a lubricant retaining function, and they can be installed into the wheel bearing quickly and in a simple manner.

In the following a rolling-element bearing unit, in particular for a wheel bearing assembly of a vehicle, is presented including a rolling-element bearing that includes a bearing outer ring and a bearing inner ring that define a bearing interior between them wherein rolling elements are disposed. The bearing inner ring furthermore includes a bearing inner ring surface facing the bearing interior and axially terminating end surfaces. In addition the rolling-element bearing unit comprises a first seal assembly that is fixed on the bearing outer ring via a retaining element and carries a seal element that slips against the bearing inner ring surface or a slip sleeve carried by the inner ring and seals the bearing interior.

In order to secure the rolling-element bearing unit against falling apart without a transport safeguard having to be removed prior to installation, it is proposed to configure the retaining element as an angle plate that includes an axially extending annular leg and a radially inwardly extending annular flange, wherein the radially inwardly extending annular flange extends over the bearing inner ring surface. The radially inwardly extending flange thus supports the bearing outer ring on the bearing inner ring and secures the assembled rolling-element bearing against falling apart. The retaining element simultaneously ensures against a penetrating of coarse dirt into the bearing during transport, installing, and operating.

According to one preferred exemplary embodiment the bearing inner ring further includes a step on the end surface associated with the seal assembly, in which step the radially inwardly extending flange is received. A transport securing that is as axially space-saving as possible can thereby be provided.

Here the step preferably includes a radially extending step surface and an axially extending step surface, wherein the radially inwardly extending flange is disposed spaced from the step surfaces and forms a gap seal. This gap seal ensures a particularly good protection against coarse contamination. A more friction-free operating of the rolling-element bearing can simultaneously thereby be ensured.

Furthermore it is advantageous if the step is formed via a slip sleeve pushed on the bearing inner ring, wherein preferably the axially extending step surface is formed via the bearing inner ring surface and the radially extending step surface by an end surface of the slip sleeve. An additional processing of the bearing inner ring is thereby omitted. In addition, existing rolling-element bearings can also be equipped with the seal assemblies. Slip sleeves have the additional advantage that they have particularly smooth surfaces that make possible a wear-free abutting of seal lips, whereby the service life of the bearing can be increased.

According to a further advantageous exemplary embodiment the end surface of the bearing inner ring and an external surface of the radially inwardly extending flange are disposed flush with respect to each other. An installing of the rolling-element bearing on a stub axle including a stub-axle step is thereby also possible.

A further exemplary embodiment shows a rolling-element bearing unit wherein the bearing outer ring is axially elongated on the side of the first seal assembly such that an end side of the bearing outer ring is formed flush with the end side of the bearing inner ring. A particularly good attachment possibility for the retaining element can thereby be provided.

According to a further advantageous embodiment the first seal assembly includes a carrier element rotatably connected to the retaining element, which carrier element is connected to the seal element in a materially-bonded manner, for example, by vulcanizing, and/or in a friction-fit manner, for example, by clamping. Here the carrier element is preferably disposed axially inside the radially inwardly extending flange of the retaining element. An ingress of dirt or water from the external environment into the bearing interior can thereby still be effectively prevented. Furthermore, the seal element can include at least one seal lip that seals with respect to the bearing inner ring and/or a slip sleeve.

Alternatively or additionally the seal element can include a preload element, for example, a spring element, which ensures a particularly good sealing.

According to a further preferred exemplary embodiment the rolling-element bearing unit includes a second seal assembly that is disposed on the axial side of the rolling-element bearing opposite the first seal assembly and seals the bearing interior. A rolling-element bearing unit can thereby be provided that includes a bearing interior sealed from an external environment. Such a rolling-element bearing unit can be provided as a preassembled bearing unit pre-filled with lubricant, which can be simply and quickly installed in a wheel bearing. An incorrect filling with "incorrect" lubricant and/or a contaminating due to an water- and/or dirt-ingress into the bearing interior is also reliably prevented. Wheel bearings can thereby also be equipped with preassembled bearing units that require the separate installation of individual rolling-element bearing units.

Here it is preferred if the second seal assembly is connected to the bearing outer ring such that they rotate together and includes a seal element that slips against the bearing inner ring surface or a slip sleeve carried by the bearing inner ring. For the attachment to the bearing outer ring such that the second seal element rotates together with the bearing outer ring, a groove is particularly preferably provided in the outer ring, in which groove the second seal assembly is received.

A further aspect of the present disclosure relates to a wheel-bearing assembly of a vehicle including a rolling-element bearing unit that can be configured as described above.

Further advantages and advantageous embodiments are defined in the description, the claims, or the drawings. Here in particular the combinations of features specified in the description and in the drawings are purely exemplary, so that the features can also be present individually or combined in other ways.

In the following the disclosure shall be described in more detail with reference to the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following identical or functionally identically operating elements are indicated by the same reference numbers.

Figure 1:
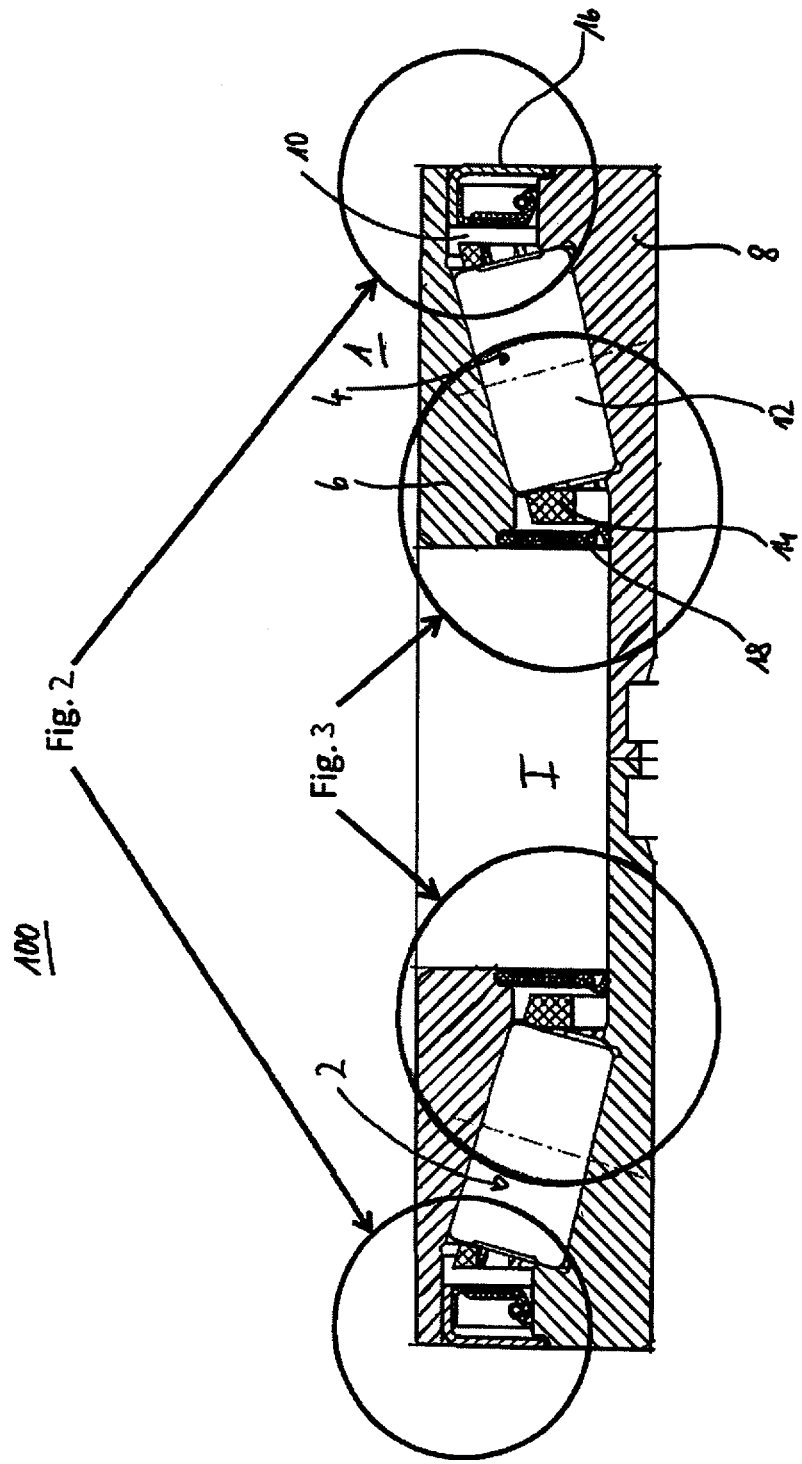
FIG. 1 is a schematic cross-sectional depiction of a wheel bearing assembly including an inventive rolling-element bearing unit.
Figure 2:
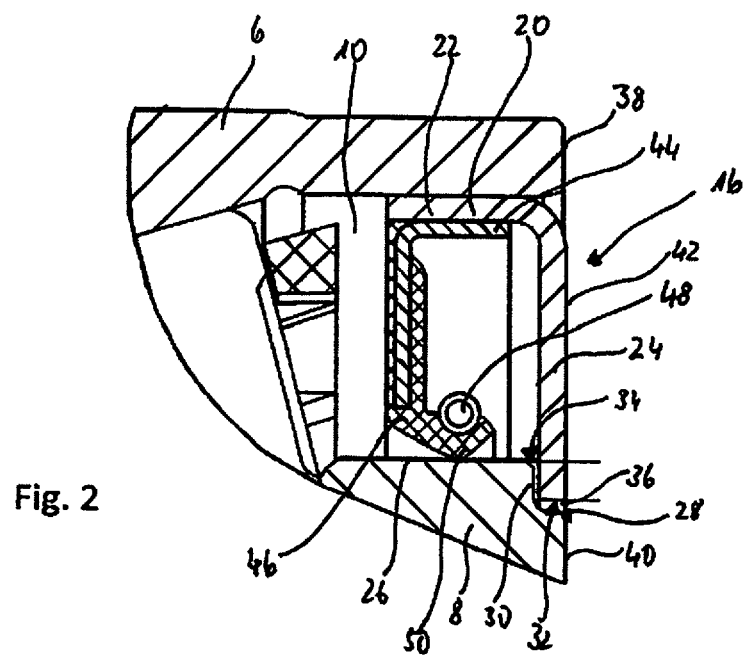
FIG. 2 is a detail view of the rolling-element bearing unit shown in FIG. 1.
Figure 3:
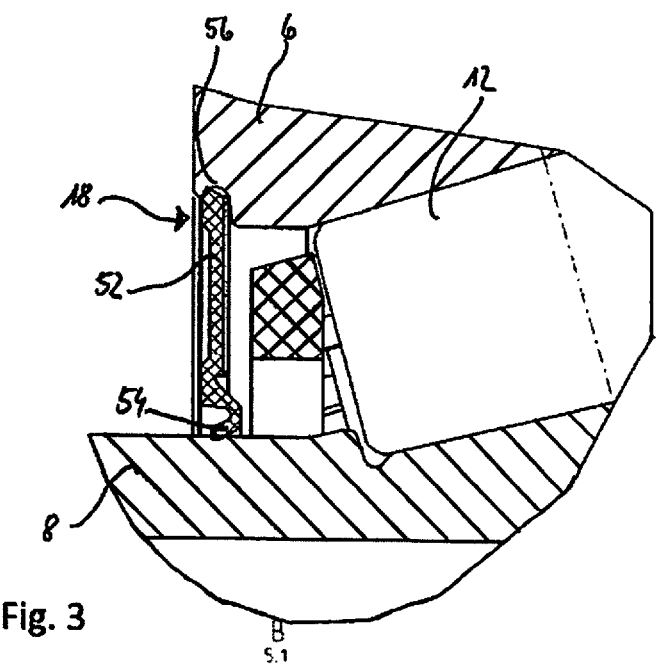
FIG. 3 is a further detail view of the rolling-element bearing unit shown in FIG. 1.

FIG. 1 shows a schematic cross-sectional depiction through a wheel bearing assembly 100 for a vehicle that is depicted sectionally enlarged in FIGS. 2 and 3. Here the wheel bearing assembly shown in FIG. 1 is configured as a double row tapered roller bearing 2, 4, wherein the two tapered roller bearings are disposed in a back-to-back arrangement in order to make possible a high stiffness with respect to lateral forces.

For the sake of simplicity, in the following the tapered roller bearing 4 is discussed that carries the inventive elements.

The rolling-element bearing 4 shown in FIG. 1 comprises a bearing outer ring 6 and a bearing inner ring 8 rotatable with respect thereto, which between them form a bearing interior space 10 wherein rolling elements 12 are disposed. Optionally the rolling elements 12 can be received in a bearing cage 14. FIG. 1 furthermore shows that axially adjacent to the rolling elements 12 between the bearing outer ring 6 and the bearing inner ring 8 a first, outer seal assembly 16 is disposed on the outer side of the wheel bearing and a second, inner seal assembly 18 on the inner side of the wheel bearing, which seal assemblies 16 and 18 seal the rolling-element bearing 4 against an ingress of dirt or water from an external environment. Together the rolling-element bearing 4 and the seal assemblies 16, 18 form a rolling-element bearing unit 1 that can be provided as preassembled and pre-lubricated rolling-element bearing unit 1 and received by a wheel hub.

However, in order to provide for the rolling-element bearing unit 1 as a preassembled unit, it must not only have a good sealing against an ingress of dirt or a discharge of lubricant, but also be secured against falling apart. Especially with the tapered roller shape depicted here, without some securing mechanism the rolling-element bearing 2;4 would easily fall apart toward the wheel bearing interior.

Therefore the first seal assembly 16 is not configured as in the prior art but rather additionally includes, as can be seen in particular in FIG. 2, a retaining element 20 that secures the bearing outer ring 6 against axial slipping. The retaining element 20 is itself configured as an angled metal-plate element including an axial section 22 that is attached to the bearing outer ring 6 such that they rotate together, and a radial flange 24 that extends toward the bearing inner ring 8. Here the radial flange 24 extends at least partially up to over or past or beyond a bearing inner ring surface 26.

Figure 4:
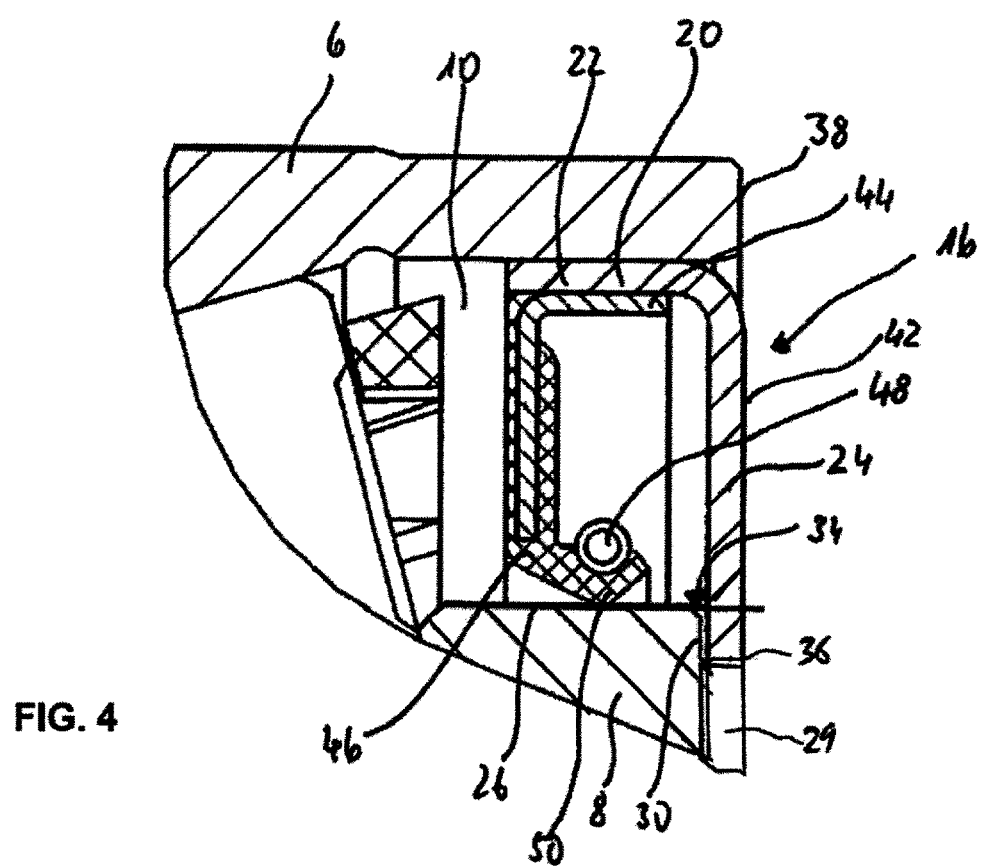
FIG. 4 is a detail view of a rolling-element bearing having a slip sleeve.

In order to make possible a particularly good receiving and supporting of the radial flange 24 on the bearing inner ring 8, a step 28 is formed on the bearing inner ring that includes a radially extending step surface 30 and an axially extending step surface 32. This step can be formed integrally with the bearing inner ring 8, however, it is also possible that the step 28 is formed via a slip sleeve 29 (FIG. 4) mounted on the bearing inner ring 8. Here the radial flange 24 is supported on the radial step surface 30 and serves as installation- and transport-safeguard against a falling apart of the rolling-element bearing 4.

Furthermore it can be seen from FIG. 2 that a gap remains between the radial flange 24 and the radial step surface 30, and a gap remains between radial flange 24 and the axial step surface 32. These gaps 34, 36 makes possible friction-free movement of the retaining element 20 with respect to the bearing inner ring 8. Simultaneously a gap seal forms here with the result that additional sealing is provided against to the entry of dirt.

FIG. 2 also shows that the bearing outer ring 6 is axially widened such that an end surface 38 of the bearing outer ring 6 is flush with an end surface 40 of the bearing inner ring 8. In addition the step 28 in the bearing inner ring 8 allows the radial outer surface 42 of the retaining element 20 to be flush with the end surface 40 of the bearing inner ring 8 or the end surface 38 of the bearing outer ring 6. The rolling-element bearing 4 can thereby be received in a problem-free manner even on stub axles including a stub-axle step, without the retaining element 20 having to be removed for installation or the total axial length of the bearing having to be adjusted.

The retaining element 20 carries the actual first seal assembly 16 that comprises a carrier element 44 including a seal element 46 attached thereto in a materially bonded manner, for example, by vulcanization, or a friction-fit manner, for example, by clamping. On a side facing the bearing interior 10 the seal element 46 extends along the carrier element 44 radially from the bearing outer ring 6 up to the bearing inner ring 8 and includes at least one seal lip 50, optionally preloaded by a spring element 48, that slips against the bearing inner ring 8 and seals the bearing interior 10. Of course all other seal elements known from the prior art are usable for the seal assembly 16.

In order to seal the rolling-element bearing 4 not only on the wheel bearing outer side but also on the wheel bearing inner side, as FIG. 1 shows the second seal assembly 18, which is depicted enlarged in FIG. 3, is provided on the wheel bearing inner side. The second seal assembly 18 is also attached to the bearing outer ring 6 essentially such that they rotate together and includes a radially extending seal ring disc 52 that radially inwardly carries a seal lip 54 that slips against the bearing inner ring 8. Radially outwardly the seal ring disc 52 is received in a groove 56 provided in the bearing outer ring 6. Of course this seal assembly can also be formed by another seal known from the prior art.

The rolling-element bearing interior is advantageously protected by the seal assemblies 16;18 disposed on both sides of the rolling elements at all times, even during installation and during transport, against the entry of dirt and/or water or a discharge of lubricant. Simultaneously the additional retaining element secure the bearing rings against falling apart or axially separating with respect to each other so that an installation- and transport-securing is provided that can even remain on the bearing in the assembled state.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling element bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Wheel bearing assembly
1 Rolling-element bearing unit
2, 4 Rolling-element bearing
6 Bearing outer ring
8 Bearing inner ring
10 Bearing interior
12 Rolling elements
14 Rolling-element bearing cage
16 First seal assembly
18 Second seal assembly
20 Retaining element
22 Axial section
24 Radial flange
26 Bearing inner ring surface
28 Step
29 Slip sleeve
30 Radial step surface
32 Axial step surface
34; 36 Gap
38; 40 Bearing ring end surface
42 Retaining element radial outer surface
44 Carrier element
46 Seal element
48 Seal lip
50 Spring element
52 Seal ring disc
54 Seal lip
56 Groove

What is claimed is:

1. A rolling-element bearing unit for a wheel bearing assembly of a vehicle, comprising:
   a rolling-element bearing including a bearing outer ring, a bearing inner ring, a bearing interior between the bearing outer ring and the bearing inner ring and a plurality of rolling elements disposed in the bearing interior, the bearing inner ring having an inner ring surface facing the bearing interior and a first and a second axial end surface,
   a first seal assembly comprising a retainer fixed on the bearing outer ring and supporting a seal element configured to slidingly seal directly against the bearing inner ring surface,
   wherein, the retainer is an angle bracket having an axially extending annular leg and a radially inwardly extending annular flange, the radially inwardly extending annular flange projecting radially inwardly beyond the bearing inner ring surface, wherein the seal element does not contact the radially inwardly extending annular flange of the retainer,
   wherein the bearing inner ring includes a step on the first axial end surface, wherein the step, when viewed in cross section, has a radially extending step surface and an axially extending step surface, and wherein the radially inwardly extending flange extends radially along the radially extending step surface, and
   wherein the step is formed by a slip sleeve pushed onto the bearing inner ring and wherein the radially extending step surface is formed by the bearing inner ring surface and the axially extending step surface is formed by an end surface of the slip sleeve.

2. The rolling-element bearing unit according to claim 1, wherein the radially inwardly extending flange is spaced from the radially extending step surface and from the axially extending step surface and forms a gap seal with the radially extending step surface and the axially extending step surface.

3. The rolling element bearing assembly according to claim 2,
wherein the first axial end surface of the bearing inner ring and an axial outer surface of the radially inwardly extending flange are coplanar,
wherein the first seal assembly includes a carrier element connected to the retainer such that they rotate together, the carrier element being connected to the seal element in a materially bonded manner or in a friction-fit manner, and wherein the carrier element is located axially inside the radially inwardly extending flange of the retaining element, and
including a second seal assembly axially opposite the plurality of rolling elements from the first seal assembly, the second seal assembly being connected to the bearing outer ring such that they rotate together and including a seal element configured to slidingly seal against the bearing inner ring surface or against a slip sleeve carried by the bearing inner ring.

4. The rolling-element bearing unit according to claim 1, wherein the first axial end surface of the bearing inner ring and an axial outer surface of the radially inwardly extending flange are coplanar.

5. The rolling-element bearing unit according to claim 1, wherein an axial end side of the bearing outer ring is coplanar with the first axial end side of the bearing inner ring.

6. The rolling-element bearing unit according to claim 1, wherein the first seal assembly includes a carrier element connected to the retainer such that they rotate together, the carrier element being connected to the seal element in a materially bonded manner or in a friction-fit manner, and wherein the carrier element is located axially inside the radially inwardly extending flange of the retaining element.

7. The rolling-element bearing unit according to claim 1, including a second seal assembly axially opposite the plurality of rolling elements from the first seal assembly.

8. The rolling-element bearing unit according to claim 7, wherein the second seal assembly is connected to the bearing outer ring such that they rotate together and includes a seal element configured to slidingly seal against the bearing inner ring surface or against a slip sleeve carried by the bearing inner ring.

9. A wheel bearing assembly of a vehicle including a rolling-element bearing unit according to claim 1.

* * * * *